(12) United States Patent
Yamamoto et al.

(10) Patent No.: US 9,243,707 B2
(45) Date of Patent: Jan. 26, 2016

(54) AUTOMATIC TRANSMISSION SHIFTER

(71) Applicant: Delta Kogyo Co., Ltd., Hiroshima (JP)

(72) Inventors: Ichiro Yamamoto, Hiroshima (JP); Yuji Shiwa, Hiroshima (JP); Keita Nishimo, Hiroshima (JP)

(73) Assignee: Delta Kogyo Co., Ltd. (JP)

( * ) Notice: Subject to any disclaimer, the term of this patent is extended or adjusted under 35 U.S.C. 154(b) by 0 days.

(21) Appl. No.: 14/314,459

(22) Filed: Jun. 25, 2014

(65) Prior Publication Data
US 2015/0000451 A1 Jan. 1, 2015

(30) Foreign Application Priority Data

Jun. 26, 2013 (JP) ................................ 2013-133598

(51) Int. Cl.
*F16H 59/08* (2006.01)
*F16H 59/02* (2006.01)
*F16H 59/10* (2006.01)

(52) U.S. Cl.
CPC ........ *F16H 59/0278* (2013.01); *F16H 59/0204* (2013.01); *F16H 59/08* (2013.01); *F16H 59/105* (2013.01); *F16H 2059/0282* (2013.01); *Y10T 74/20104* (2015.01)

(58) Field of Classification Search
CPC ..... F16H 59/10; F16H 59/0204; F16H 59/08; F16H 59/105; F16H 2059/006; F16H 2059/0239; F16H 59/044; F16H 59/02; F16H 59/0217; F16H 2059/0282; F16H 2061/326; F16H 59/027

USPC ................... 74/473.1, 473.25, 473.18, 473.2, 74/473.21, 473.23, 473.26, 473.24, 473.3, 74/473.31; 192/220.1, 220.2, 220.3, 220.4

See application file for complete search history.

(56) References Cited

U.S. PATENT DOCUMENTS

| 4,880,092 | A | * | 11/1989 | Kito et al. | 477/96 |
|---|---|---|---|---|---|
| 5,186,069 | A | * | 2/1993 | Asano et al. | 74/473.23 |
| 5,791,197 | A | * | 8/1998 | Rempinski et al. | 74/473.18 |
| 6,189,398 | B1 | | 2/2001 | Kataumi et al. | |
| 6,783,480 | B2 | * | 8/2004 | Masuda et al. | 477/94 |
| 6,848,560 | B2 | * | 2/2005 | Inoue | 192/220.5 |
| 7,114,410 | B2 | * | 10/2006 | Nagasawa | 74/473.18 |
| 7,621,198 | B2 | * | 11/2009 | Kako et al. | 74/523 |
| 8,312,786 | B2 | * | 11/2012 | Ueta et al. | 74/473.23 |
| 8,316,734 | B2 | * | 11/2012 | Giefer et al. | 74/473.25 |
| 8,347,752 | B2 | * | 1/2013 | Weifels | 74/473.21 |
| 8,397,894 | B2 | * | 3/2013 | Jeong | 192/220.3 |
| 9,003,916 | B2 | * | 4/2015 | Sasaki et al. | 74/473.1 |
| 2003/0085098 | A1 | | 5/2003 | Inoue | |
| 2005/0160859 | A1 | | 7/2005 | Buerger et al. | |
| 2008/0072698 | A1 | * | 3/2008 | Hirano | 74/473.21 |
| 2008/0098844 | A1 | * | 5/2008 | Kato et al. | 74/473.18 |

* cited by examiner

*Primary Examiner* — William Kelleher
*Assistant Examiner* — Jude Agendia
(74) *Attorney, Agent, or Firm* — Gerald E. Hespos; Michael J. Porco; Matthew T. Hespos

(57) ABSTRACT

An automatic transmission shifter includes: a shifter body; a shift lever; a control switch unit for controlling the shift lever; and a switch-unit holding member holding the control switch unit. The switch-unit holding member is attached to the shifter body. The control switch unit has a shifter body-based positioning portion configured to be positioned with respect to the shifter body during an operation of attaching the switch-unit holding member to the shifter body.

3 Claims, 12 Drawing Sheets

AUTOMATIC TRANSMISSION SHIFTER

TECHNICAL FIELD

The present invention relates to a shifter for an automatic transmission usable in a vehicle such as an automotive vehicle.

BACKGROUND ART

Heretofore, there has been known a shifter for an automatic transmission usable in a vehicle such as an automotive vehicle, wherein the shifter comprises a shift lock switch (shift lock mechanism) for performing control of locking and unlocking (lock-releasing) a shift lever in a state in which the shift lever is shifted to a parking range position, as disclosed, for example, in JP 11-245680A.

A shift lock mechanism disclosed in the above patent publication is configured to be engaged with an arm formed at a lower end of a rod provided inside a shift lever in an axially movable manner, to thereby inhibit the movement of the rod. More specifically, the shift lock mechanism disclosed in the above patent publication comprises: a key lever and a support lever configured to clampingly hold the arm therebetween; a lock pin configured to be engaged with a concave portion provided in the support lever to thereby inhibit rotational movement of the support lever; and an actuator configured to cause the lock pin to be engaged and disengaged with respect to the concave portion. In the above patent publication, these components of the shift lock mechanism, i.e., the key lever, the support lever, the lock pin and the actuator, are assembled inside a shifter.

However, due to the configuration in which the components of the shift lock mechanism such as the actuator are assembled inside the shifter, the shifter disclosed in the above patent publication has a problem that it is necessary to take a lot of time for the assembling.

It is therefore an object of the present invention to provide an automatic transmission shifter capable of allowing a control switch unit for controlling a shift lever to be readily assembled to a predetermined position.

SUMMARY OF THE INVENTION

In order to achieve the above object, the present invention provides an automatic transmission shifter which comprises: a shifter body fixedly attachable to a vehicle body; a shift lever swingably held by the shifter body; a control switch unit for controlling the shift lever; and a switch-unit holding member holding the control switch unit, wherein the switch-unit holding member is attached to the shifter body, and the control switch unit has a shifter body-based positioning portion configured to be positioned with respect to the shifter body during an operation of attaching the switch-unit holding member to the shifter body.

The automatic transmission shifter of the present invention is capable of allowing the control switch unit for controlling the shift lever to be readily assembled to a predetermined position.

DESCRIPTION OF EMBODIMENTS

Figure 1:
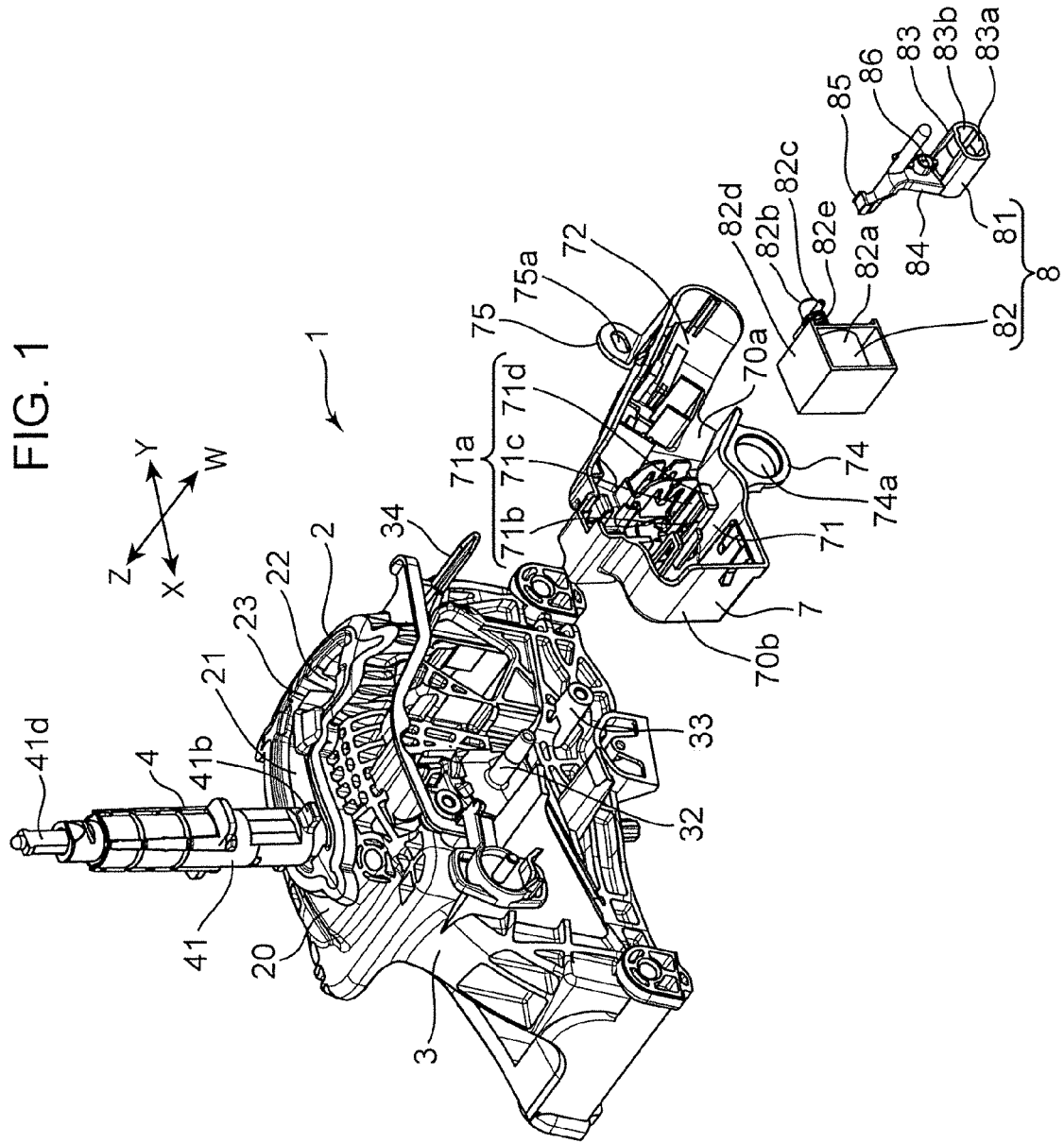
FIG. 1 is a perspective view of an automatic transmission shifter according to one embodiment of the present invention.
Figure 2:
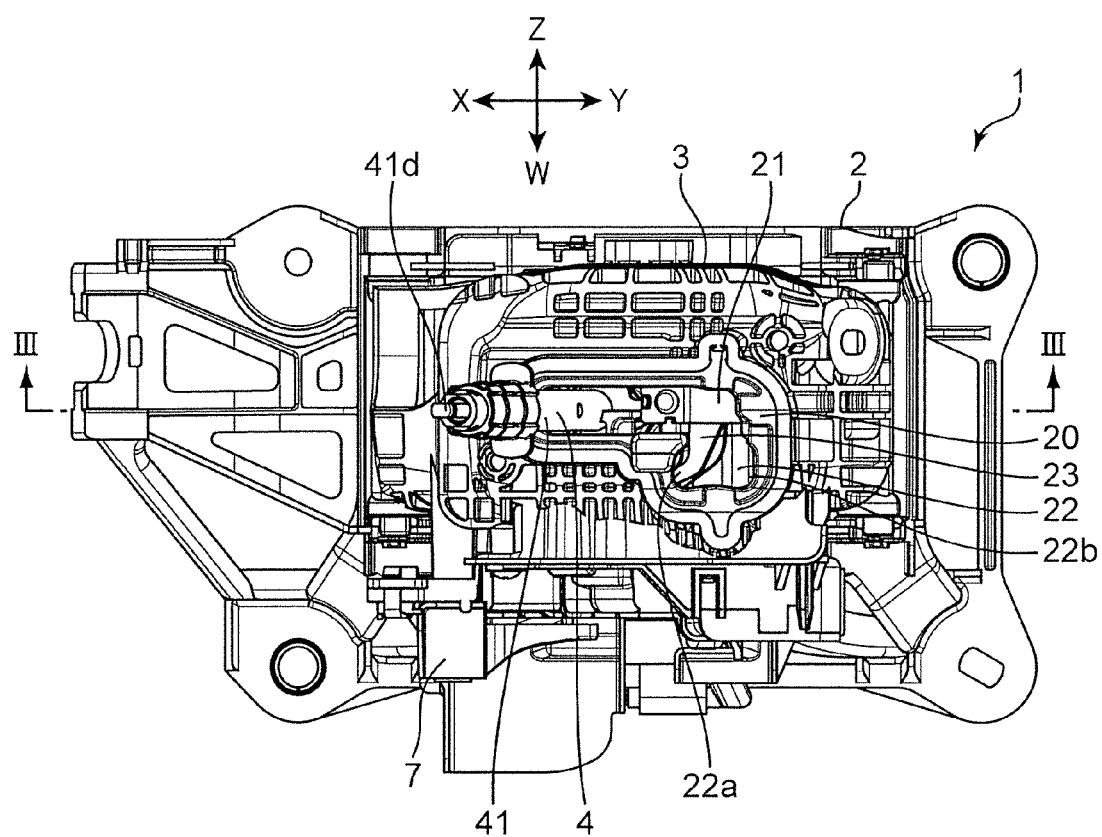
FIG. 2 is a top plan view of the automatic transmission shifter in FIG. 1.

With reference to the drawings, the present invention will now be described in detail, based on an embodiment thereof. FIG. 1 and FIG. 2 are, respectively, a perspective view and a top plan view of an automatic transmission shifter according to one embodiment of the present invention, and FIG. 3 is a sectional view taken along the line in FIG. 2, wherein the direction X and the direction Y indicate a front direction and a rear direction, respectively, and the direction Z and the direction W indicate a right direction and a left direction, respectively.

Figure 3:
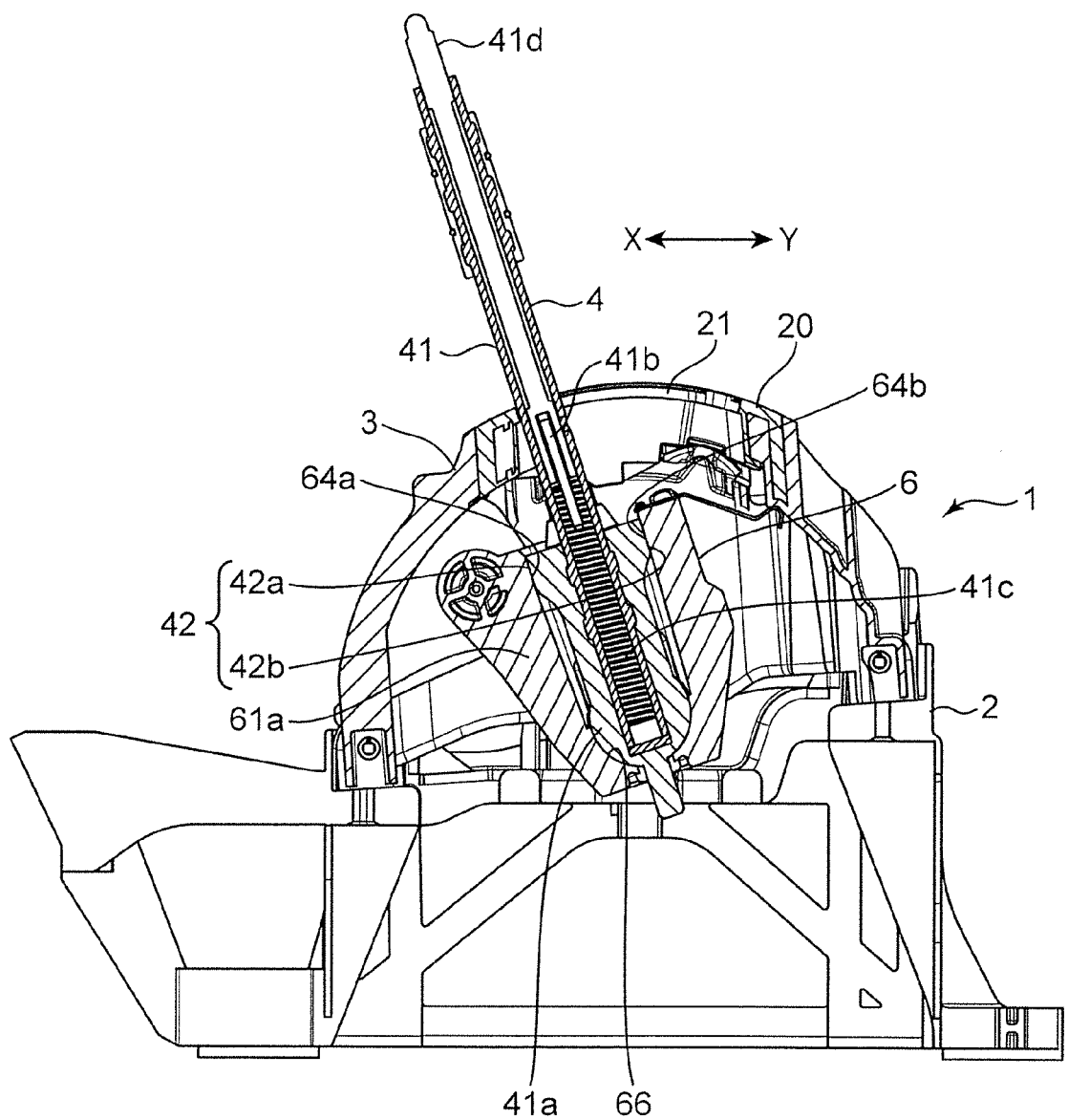
FIG. 3 is a sectional view taken along the line in FIG. 2.

The automatic transmission shifter 1 according to this embodiment is designed for an automotive vehicle, and comprises: a shifter body 2 fixedly attachable to a vehicle body; a shift lever 4 swingably held by the shifter body 2; a control switch unit (8, 9) for controlling the shift lever 4; and a switch-unit holding member 7 holding the control switch unit (8, 9), as illustrated in FIGS. 1 to 3.

Figure 4:
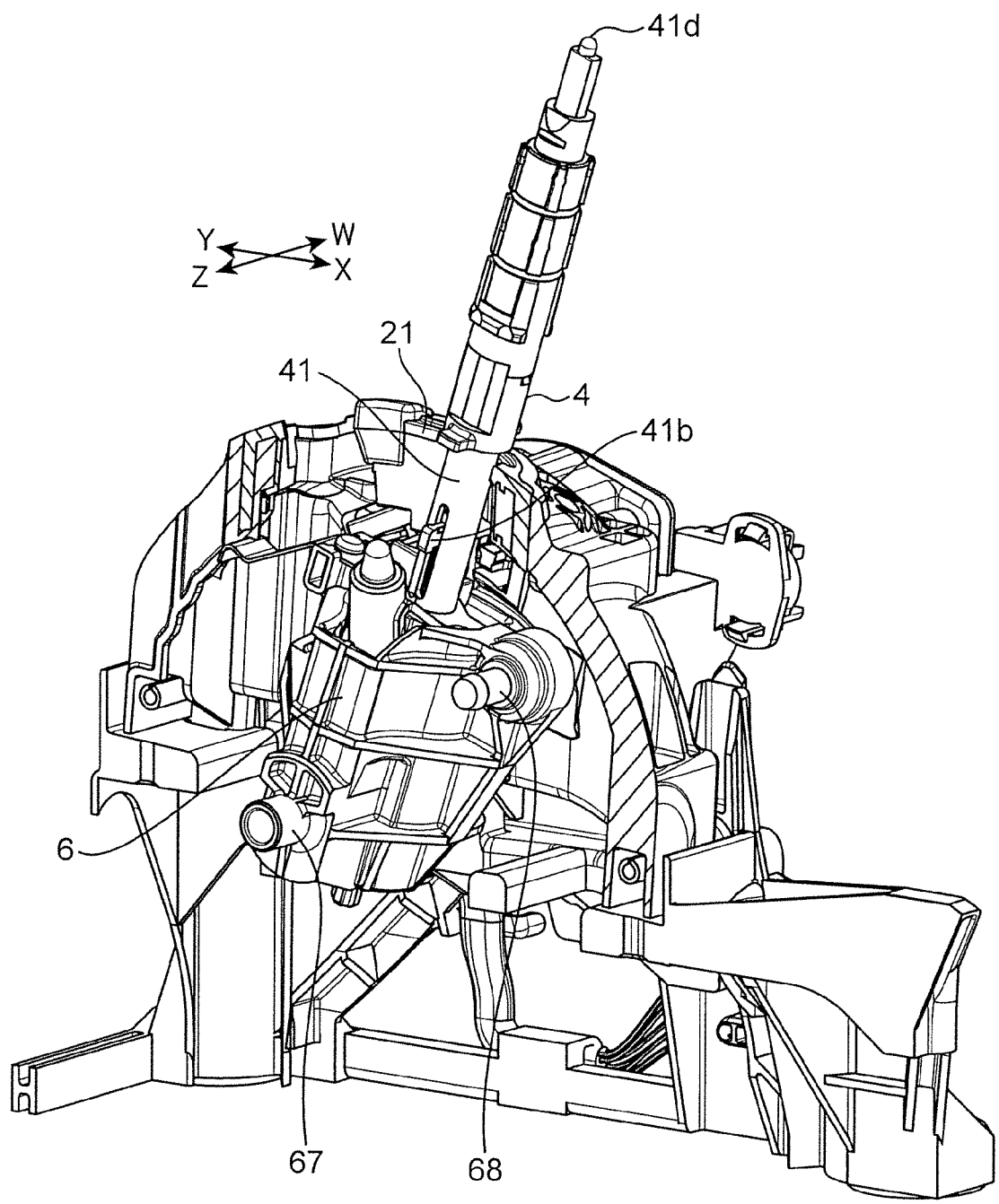
FIG. 4 is a partially-sectional perspective view of the automatic transmission shifter in FIG. 1.

The shifter body 2 comprises a housing 3, and an automatic transmission-manipulating member 6 (illustrated in FIGS. 3 and 4) configured to be coupled to an automatic transmission mounted on the vehicle body to manipulate the automatic transmission.

The housing 3 has a gate (21 to 23) formed in a top wall 20 thereof to penetrate between an upper surface and a lower surface thereof.

In this embodiment, the gate comprises an automatic-shift-mode gate 21, a manual-shift-mode gate 22, and a communication passage 23 provided between the automatic-shift-mode gate 21 and the manual-shift-mode gate 22 to communicate therebetween.

The automatic-shift-mode gate 21 is configured to allow the shift lever 4 to be moved therealong in an automatic shift mode. The automatic-shift-mode gate 21 is provided to linearly extend in a front-rear direction.

The manual-shift-mode gate 22 is provided on a left side of the automatic-shift-mode gate 21 and parallel to the automatic-shift-mode gate 21. In this embodiment, a front side of the manual-shift-mode gate 22 is set as a minus gate 22a, and a rear side of the manual-shift-mode gate 22 is set as a plus gate 22a.

Although not illustrated, a cover is provided on the upper surface of the top wall 20 in such a manner as to be superimposed thereon from thereabove. This cover is composed of a plate-like member having a set of gate-equivalent holes each having approximately the same shape as a respective one of the gates 21 to 23 of the top wall 20. The cover has an indication area indicating various ranges set for the automatic-shift-mode gate, beside the automatic-shift-mode gate-equivalent holes.

Specifically, alphabets "P", "R", "N" and "D" are indicated on the indication area at respective positions corresponding to "parking range", "reverse range" "neutral range" and "drive range, which are set in this order in a front-to-rear direction.

Figure 5:
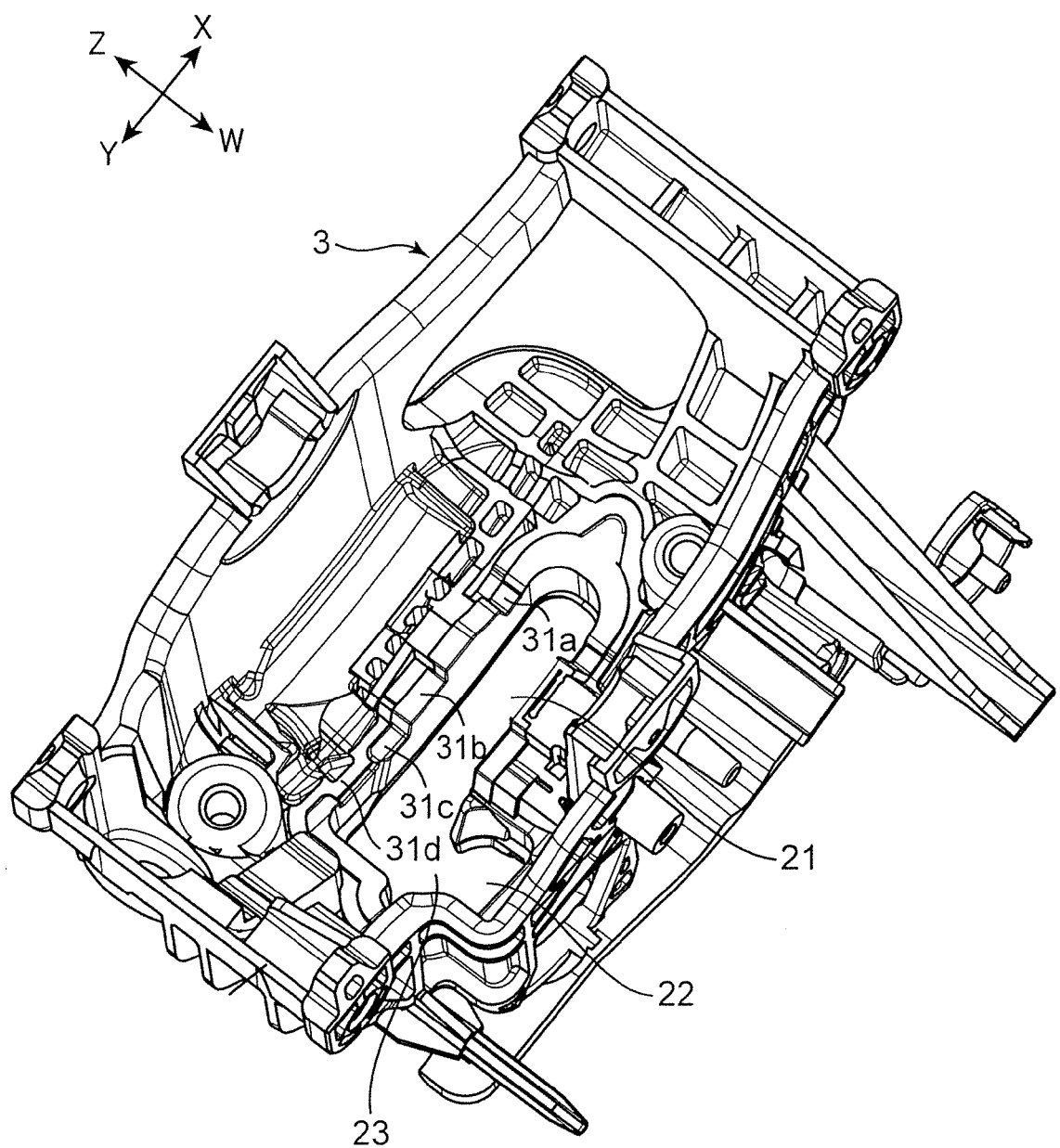
FIG. 5 is a perspective view of the automatic transmission shifter in FIG. 1, when viewed upwardly from the side of a bottom of a housing thereof.

As illustrated in FIG. 5, the housing 3 has a plurality of locking piece-receiving recesses (31a to 31d) each formed in a bottom edge surface of a gate defining wall defining the automatic-shift-mode gate 21, in such a manner as to be concaved from the bottom edge surface.

The plurality of locking piece-receiving recesses comprise a parking range-locking recess 31a, a reverse range-locking recess 31b, a neutral range-locking recess 31c and a drive range-locking recess 31d, which are arranged in this order in the front-to-rear direction.

The parking range-locking recess 31a, the reverse range-locking recess 31b, the neutral range-locking recess 31c and the drive range-locking recess 31d are configured to receive and lock the aftermentioned locking piece 41b of the shift lever 4, respectively, in the parking range, the reverse range, the neutral range and the drive range each set for the automatic-shift-mode gate 21.

As illustrated in FIG. 1, the housing 3 has a switch-unit mounting portion (32 to 34) provided on a left sidewall thereof to allow the switch-unit holding member 7 to be attached thereto.

In this embodiment, the switch-unit mounting portion comprises three mounting shafts consisting of first to third switch-unit mounting shafts 32 to 34. The first switch-unit mounting shaft 32 is designed to function as a reference portion of the shifter body to be used for a positional reference of the control switch unit (8, 9) with respect to the shifter body 2, during an operation of attaching the control switch unit (8, 9) to the shifter body 2, and provided to protrude leftwardly from the left sidewall of the housing 3 in a cylindrical shape.

The second switch-unit mounting shaft 33 is provided rearward and downward of the first switch-unit mounting shaft 32 to protrude leftwardly from the left sidewall of the housing 3. The third switch-unit mounting shaft 34 is provided rearward and upward of the first switch-unit mounting shaft 32 to protrude leftwardly from the left sidewall of the housing 3.

Figure 7:
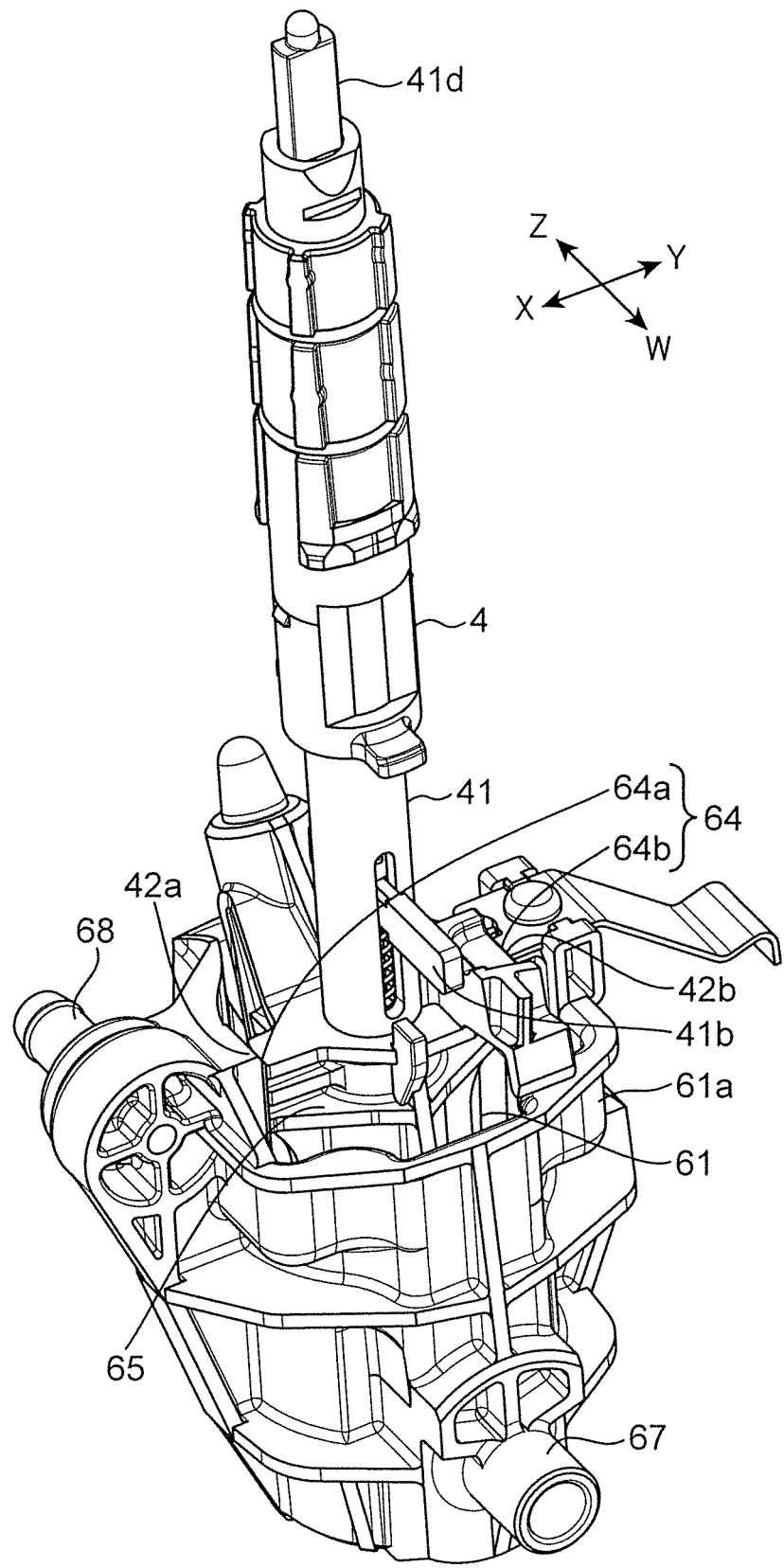
FIG. 7 is a perspective view of an automatic transmission-manipulating member and the shift lever, wherein a manipulation member-coupling portion of the shift lever is coupled to a lever-coupling portion of the automatic transmission-manipulating member.
Figure 8:
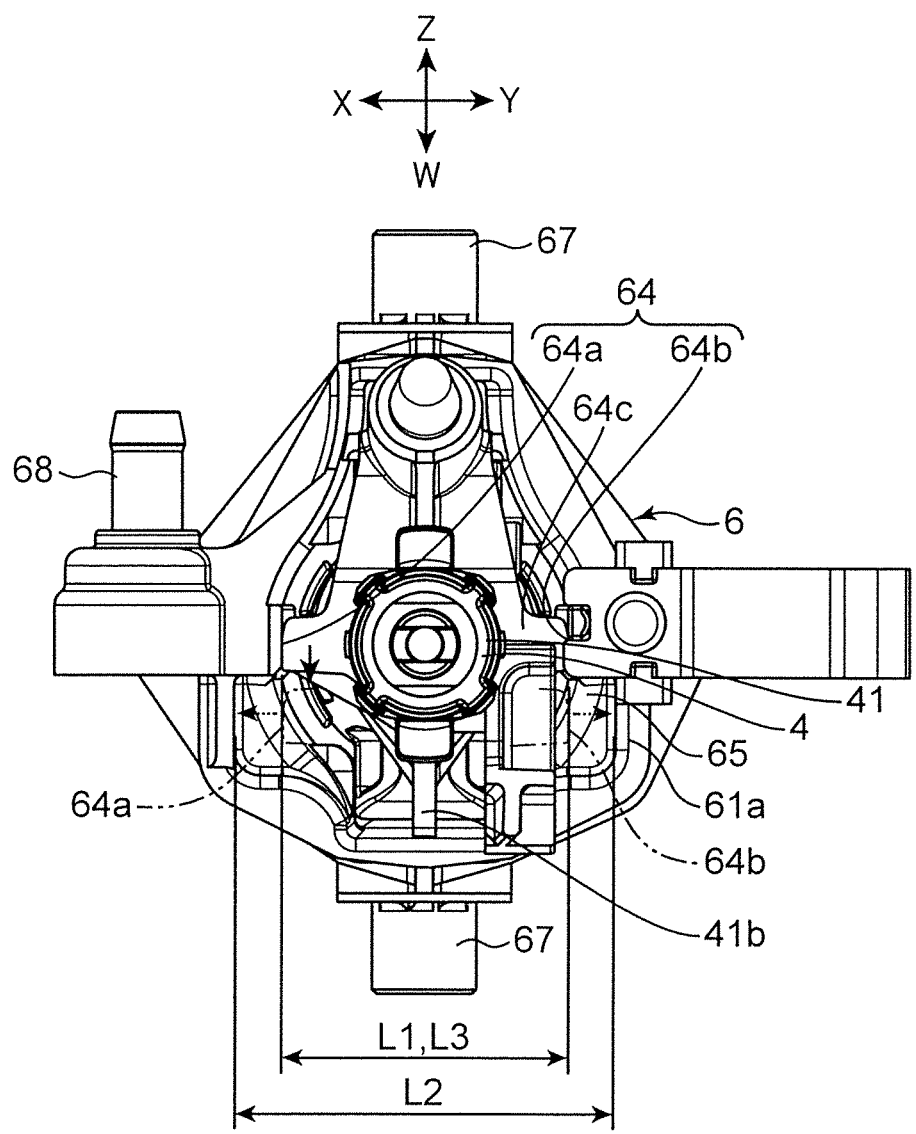
FIG. 8 is a top plan view of the automatic transmission-manipulating member and the shift lever in FIG. 7.

In this embodiment, as illustrated in FIGS. 7 and 8, the automatic transmission-manipulating member 6 comprises a receiving section 61 which receives therein an aftermentioned manipulating member-coupling portion 42 of the shift lever 4.

The receiving section 61 has a peripheral wall 61a opened upwardly. The peripheral wall 61a has an upper portion formed to surround the aftermentioned manipulating member-coupling portion 42 around the entire circumference thereof, and an inner periphery of the upper portion comprises a lever-coupling portion 64 configured to be coupled and decoupled with respect to the aftermentioned manipulating member-coupling portion 42 of the shift lever 4, and a lever loose-fitting portion 65 configured to allow the aftermentioned manipulating member-coupling portion 42 to be loosely fitted thereinto.

The lever-coupling portion 64 comprises a first lever-coupling sub-portion 64a and a second lever-coupling sub-portion 64b which are opposed to each other in a shift direction (front-rear direction). The first lever-coupling sub-portion 64a and the second lever-coupling sub-portion 64b are formed to be located in opposed and spaced-apart relation to each other in the shift direction by a distance L1 (illustrated in FIG. 8), thereby defining therebetween a lever fit-insertion space 64c for allowing the aftermentioned manipulating member-coupling portion 42 to be fittingly inserted thereinto.

The lever loose-fitting portion 65 is formed to be communicated with the lever fit-insertion space 64c of the lever-coupling portion 64. The lever loose-fitting portion 65 is formed on a left side of the lever-coupling portion 64 (on one side of the lever-coupling portion in a select direction (right-left direction)). The aftermentioned manipulating member-coupling portion 42 is configured to be movable between the lever coupling portion 64 and the lever loose-fitting portion 65.

The lever loose-fitting portion 65 is formed such that an interspace distance L2 thereof in the shift direction is greater than the distance L1 of the lever fit-insertion space 64c so as to allow the aftermentioned manipulating member-coupling portion 42 to be moved in the shift direction (when it is loosely fitted therein).

As illustrated in FIG. 3, the peripheral wall 61a has a lower portion formed in a shape which gradually shrinks downwardly, and comprises a hemispherical-shaped lever holding portion 66 provided in an inner periphery of an lower end thereof and configured to swingably hold the shift lever 4.

As illustrated in FIGS. 7 and 8, the automatic transmission-manipulating member 6 has a pair of pivot shafts 67 provided, respectively, on right and left sides of the lower end to protrude outwardly from an outer peripheral surface of the lower end.

The automatic transmission-manipulating member 6 further comprises an automatic transmission-coupling portion 68 provided on an outer periphery of the upper portion of the peripheral wall 61a, and a non-illustrated automatic transmission provided on the vehicle is coupled to the automatic transmission-coupling portion 68 via a non-illustrated coupling member.

The automatic transmission-manipulating member 6 formed as above is provided inside the housing 3 in such a manner that the pivot shafts 67 are pivotally supported by the housing 3 in a rotationally movable manner in the shift direction. Thus, the automatic transmission-manipulating member 6 is swingingly moved with respect to the housing 3 in the shift direction about the pivot shafts 67 to manipulate the automatic transmission.

As illustrated in FIG. 3, the shift lever 4 comprises a lever shaft body 41, and a manipulating member-coupling portion 42 capable of being coupled and decoupled with respect to the automatic transmission-manipulating member 6. The lever shaft body 41 has an upper (in FIG. 3) distal end to which a non-illustrated operating grip member is attached. A driver or the like can manually grip and operate the attached operating grip member to manually operate the lever shaft body 41.

The lever shaft body 41 has a lower (in FIG. 3) base end formed as a spherical-shaped portion 41a made of a synthetic resin.

Figure 6:
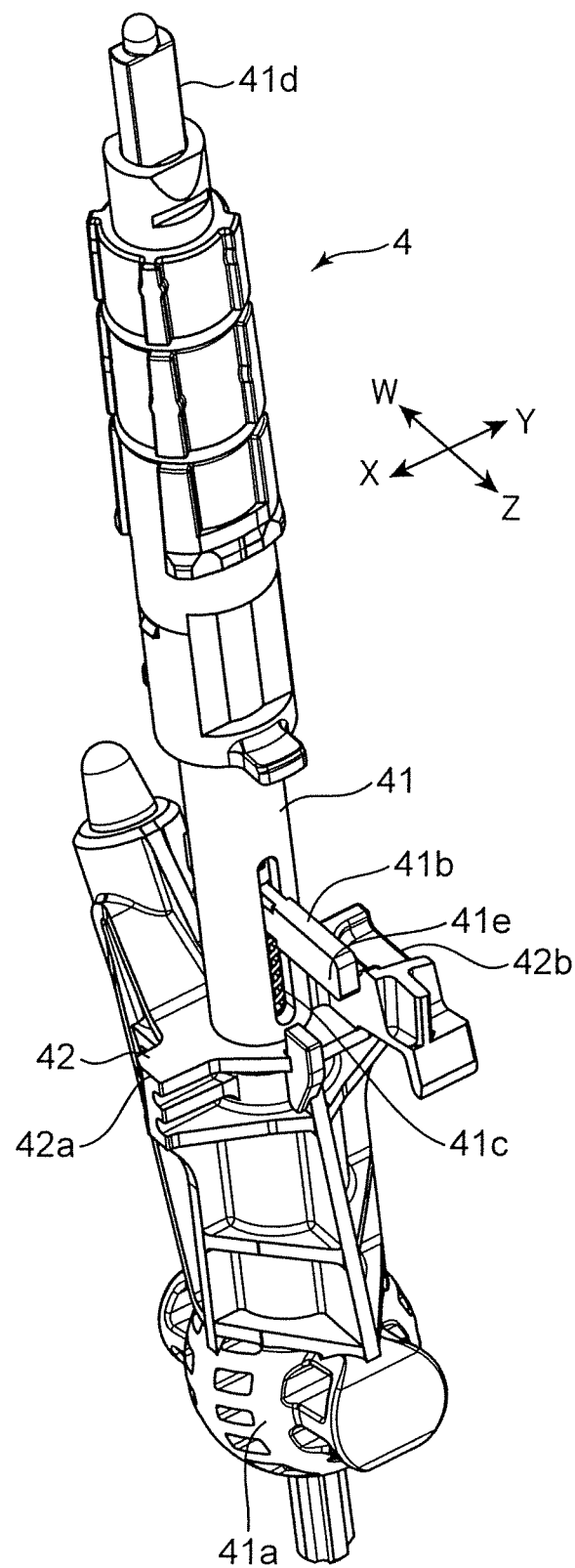
FIG. 6 is a perspective view of a shift lever in the automatic transmission shifter in FIG. 1.

As illustrated in FIG. 6, the lever shaft body 41 has a locking piece 41b provided in an up-down directional approximately central portion thereof in such a manner as to be movable in an up-down direction. The locking piece 41b is provided as a means to allow the lever shaft body 41 to be releasably locked in each of the ranges of the automatic-shift-mode gate 21 in the shifter body 2. The locking piece 41b has a protruding portion 41e protruding leftwardly from an outer periphery of the lever shaft body 41.

The locking piece 41b is biased upwardly by a coil spring 41c provided inside the lever shaft body 41. According to a biasing force of the coil spring 41c, the locking piece 41b is entered into and locked in one of the locking piece-receiving recesses 31a to 31d of the shifter body 2. Then, when a pushing operation member 41d provided at an upper end of the lever shaft body 41 is manually pushed downwardly against the biasing force of the coil spring 41c, the locking piece 41b is moved downwardly out of the locking piece-receiving recesses 31a to 31d, to allow the lever shaft body 41 to be moved along the automatic-shift-mode gate 21.

The manipulating member-coupling portion 42 comprises a first manipulation member-coupling sub-portion 42a configured to be coupled and decoupled with respect to the first lever-coupling sub-portion 64a, and a second manipulation member-coupling sub-portion 42b configured to be coupled and decoupled with respect to the second lever-coupling sub-portion 64b.

The first manipulation member-coupling sub-portion 42a is formed to protrude forwardly from the outer periphery of the lever shaft body 41.

The second manipulation member-coupling sub-portion 42b is formed behind the lever shaft body 41, i.e., on a side opposite to the first manipulation member-coupling sub-portion 42a across the lever shaft body 41, to protrude rearwardly from the outer periphery of the lever shaft body 41.

As illustrated in FIG. 8, a distance L3 between the first manipulation member-coupling sub-portion 42a and the second manipulation member-coupling sub-portion 42b is set to be approximately equal to the distance L1 between the first lever-coupling sub-portion 64a and the second lever-coupling sub-portion 64b, so as to allow the manipulating member-coupling portion 42 to be fittingly inserted into the lever fit-insertion space 64c approximately without any gap.

Further, the distance L3 is less than the interspace distance L2 of the lever loose-fitting portion 65, so that the manipulating member-coupling portion 42 can be moved within the lever loose-fitting portion 65 in the shift direction.

As illustrated in FIG. 3, the shift lever 4 configured as above is inserted into the receiving section 61 of the automatic transmission-manipulating member 6 from thereabove, and held with respect to the lever holding portion 66 in a swingable manner in the shift and select directions.

The switch-unit holding member 7 will be described below. As illustrated in FIG. 1, the switch-unit holding member 7 is formed to have a right sidewall 70a, and a peripheral wall 70b extending leftwardly from a peripheral edge of the right sidewall to define an opening at a left end thereof.

Figure 10:
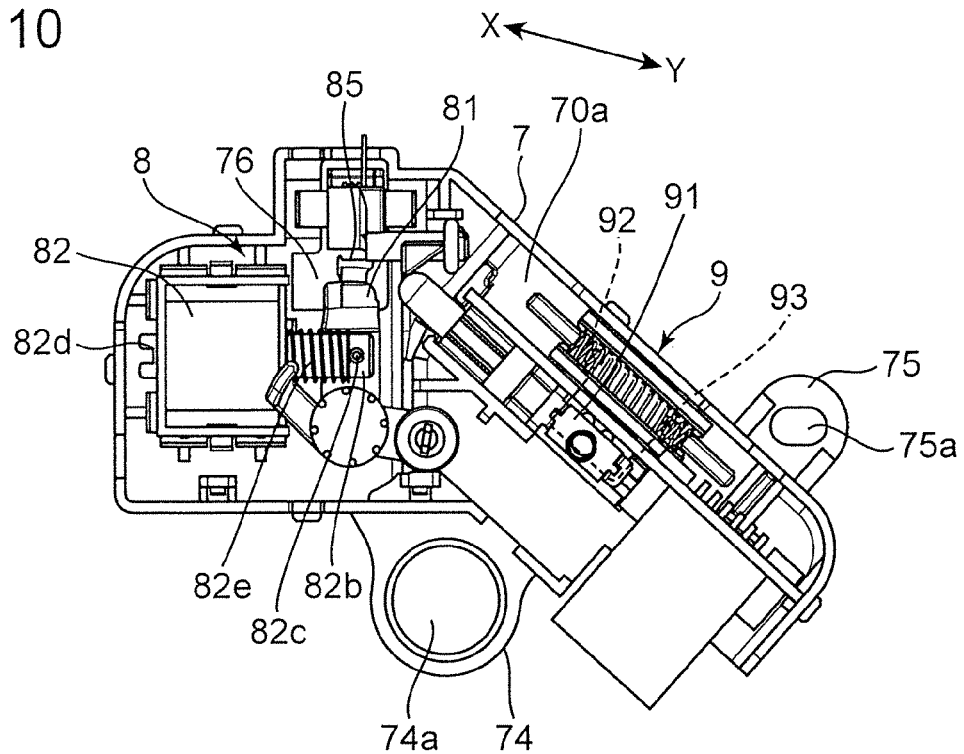
FIG. 10 is a left side view of a switch-unit holding member holding a control switch unit.

As illustrated in FIGS. 1 and 10, the switch-unit holding member 7 has a shift-lock-switch holding portion 71 located on a front side thereof to hold an aftermentioned shift lock switch 8, and a manual-gate-entry detection switch holding portion 72 located on a rear side thereof to hold an aftermentioned manual-gate-entry detection switch 9.

The shift-lock-switch holding portion 71 has a cam holding sub-portion 71a holding a holdable sub-portion 83b of a tubular portion 83 of an aftermentioned shift lock cam 81. The cam holding sub-portion 71a comprises a front support beam 71b, a rear support beam 71c, and a coupling piece 71d coupling them together.

The front support beam 71b is formed to protrude leftwardly from the right sidewall 70a. The rear support beam 71c is formed to extend parallel to the front support beam 71b, in front-rear paired relation with the front support beam 71b.

Figure 12:
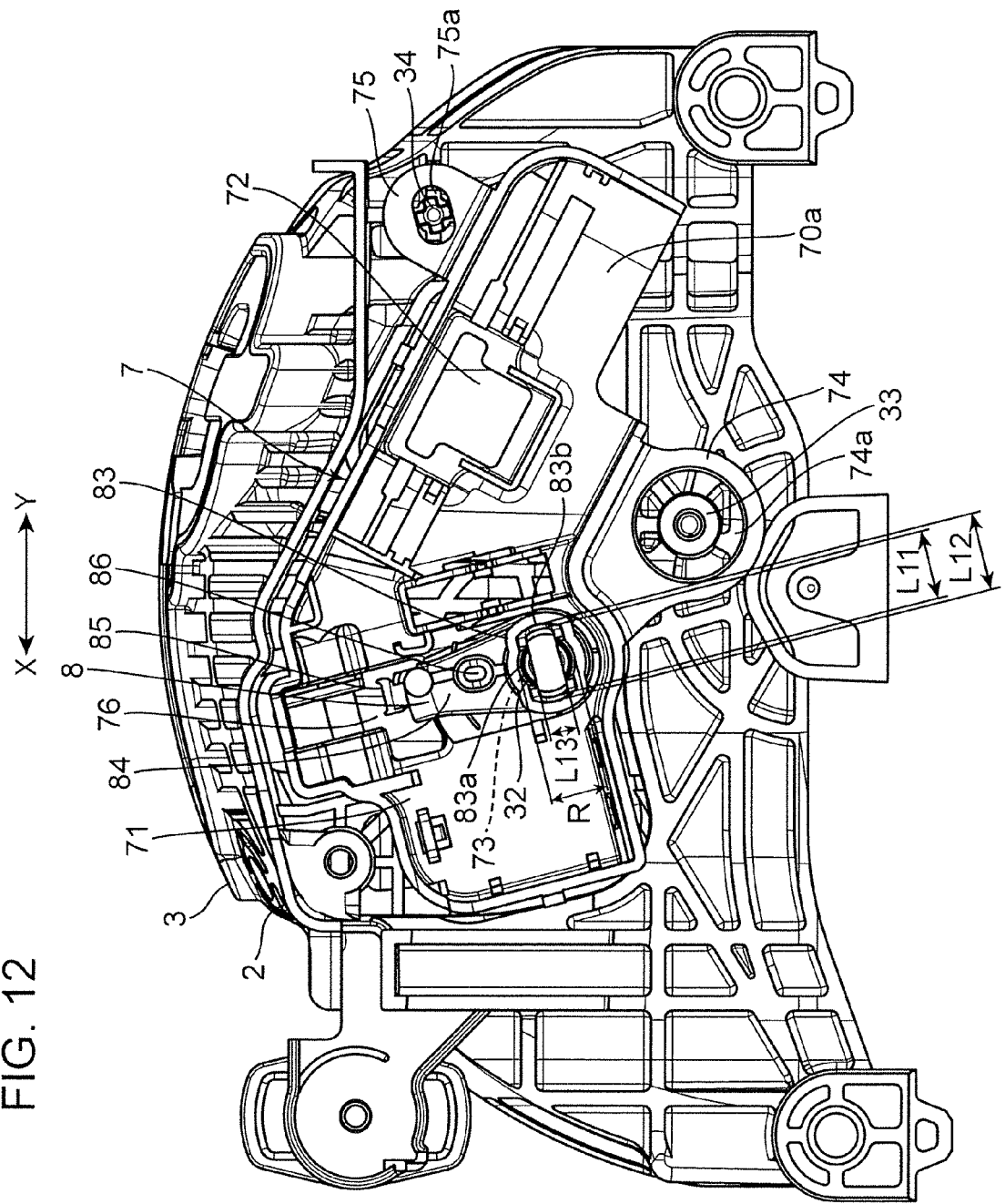
FIG. 12 is a left side view of the shifter body with the switch-unit holding member attached thereto.

The coupling piece 71d is provided to couple distal ends of the front support beam 71b and the rear support beam 71c. As illustrated in FIG. 12, the coupling piece 71d has an up-down directional width L13 which is set to be less than an outer diameter R of the first switch-unit mounting shaft 32.

Figure 11:
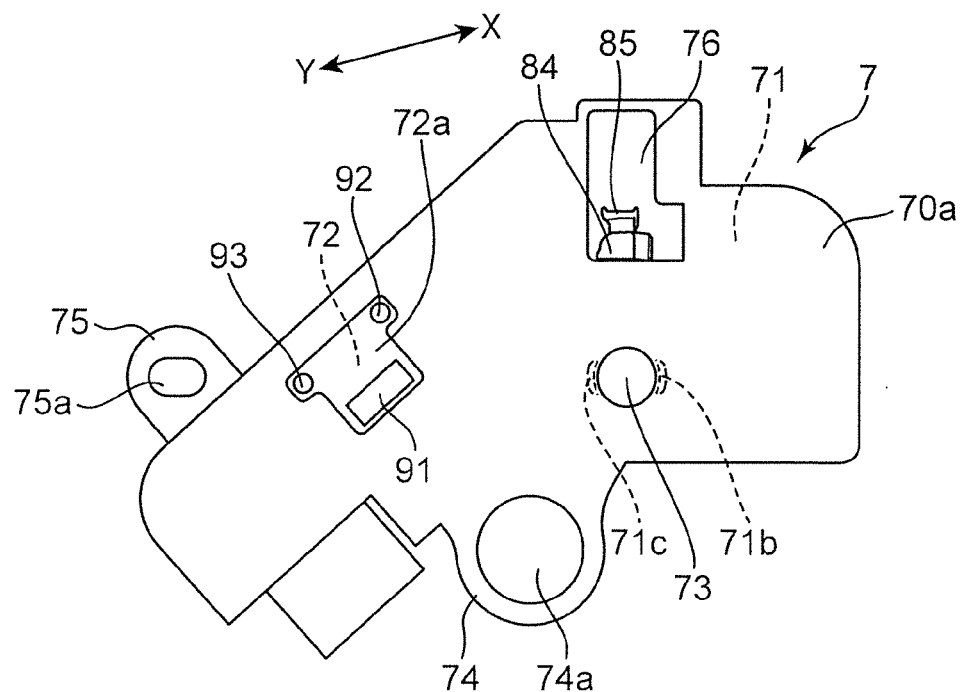
FIG. 11 is a right side view of the switch-unit holding member holding the control switch unit.

As illustrated in FIGS. 10 to 12, the shift-lock-switch holding portion 71 has a lead-out hole 76 for leading a locking-piece contact portion 85 of the aftermentioned shift lock cam 81 toward a right side of the right sidewall 70a. The lead-out hole 76 is formed in the right sidewall 70a to penetrate the right sidewall 70a.

The manual-gate-entry detection switch holding portion 72 has a receiving hole 72a for receiving therein the aftermentioned manual-gate-entry detection switch 9.

The switch-unit holding member 7 has a shifter-body attaching portion (73 to 75) attachable to the shifter body 2. In this embodiment, the shifter-body attaching portion comprises: a first shifter-body attaching sub-portion 73 attachable to the first switch-unit mounting shaft 32 of the shifter body 2; a second shifter-body attaching sub-portion 74 attachable to the second switch-unit mounting shaft 33 of the shifter body 2; and a third shifter-body attaching sub-portion 75 attachable to the third switch-unit mounting shaft 34 of the shifter body 2.

As illustrated in FIG. 11, the first shifter-body attaching sub-portion 73 is composed of a circular hole formed in the right sidewall 70a to penetrate the right sidewall 70a at a position between the front support beam 71b and the rear support beam 71c of the cam holding sub-portion 71a.

The second shifter-body attaching sub-portion 74 is formed to protrude downwardly from a lower wall of the shift-lock-switch holding portion 71 and have a circular attaching hole 74a.

The third shifter-body attaching sub-portion 75 is formed to protrude upwardly from an upper wall of the shift-lock-switch holding portion 71 and have an elongate attaching hole 75a.

As illustrated in FIG. 12, the switch-unit holding member 7 is attached to the left side of the shifter body 2, in such a manner that the first switch-unit mounting shaft 32, the second switch-unit mounting shaft 33 and the third switch-unit mounting shaft 34 of the shifter body 2 are fittingly inserted, respectively, in the first shifter-body attaching sub-portion 73, the second shifter-body attaching sub-portion 74 and the third shifter-body attaching sub-portion 75.

In this state, an outer periphery of the first switch-unit mounting shaft 32 protrudes outwardly from upper and lower edges of the cam holding sub-portion 71a. Further, the lead-out hole 76 is aligned with a through-hole (not illustrated) provided in a left wall of the shifter body 2, so that an arm 84 of the aftermentioned shift lock cam 81 enters from the shift-lock-switch holding portion 71 into the shifter body 2 through the lead-out hole 76 and the through-hole.

As illustrated in FIGS. 1 and 10, the control switch unit (8, 9) comprises a shift lock switch (shift lock mechanism) 8 configured to lock the shift lever 4 at a predetermined position and release the locked state, and a manual-gate-entry detection switch 9 configured to detect entry of the shift lever 4 into the manual-shift-mode gate 22. It should be noted that the manual-gate-entry detection switch 9 is omitted in FIG. 1.

The shift lock switch 8 comprises a shift lock cam 81, and a solenoid (actuating member) 82 configured to actuate the shift lock cam 81.

The shift lock cam 81 has a tubular portion 83 held by the switch-unit holding member 7, and an arm 84 extending upwardly from the tubular portion 83.

The tubular portion 83 has a first-mounting-shaft fit-insertion sub-portion 83a provided on upper and lower sides of a front-rear directional central region of an inner periphery thereof and configured to allow the first switch-unit mounting shaft 32 to be fittingly inserted thereinto (to come into contact therewith) in a rotationally movable manner, and a holdable sub-portion 83b provided on front and rear sides of the first-mounting-shaft fit-insertion sub-portion 83a in the inner periphery thereof and configured to be held by the switch-unit holding member 7.

The first-mounting-shaft fit-insertion sub-portion 83a serves as a shifter body-based positioning portion for allowing the control switch unit (8, 9) to be positioned with respect to the shifter body 2 during an operation of attaching the switch-unit holding member 7 to the shifter body 2. The first-mounting-shaft fit-insertion sub-portion 83a is formed to have an inner diameter approximately equal to the outer diameter R (illustrated in FIG. 12) of the first switch-unit mounting shaft 32. Thus, when the first switch-unit mounting shaft 32 is fittingly inserted into the first-mounting-shaft fit-insertion sub-portion 83a, the first-mounting-shaft fit-insertion sub-portion 83a is positioned in concentric relation to the first switch-unit mounting shaft 3.

As illustrated in FIG. 12, the cam holding sub-portion 71a of the shift-lock-switch holding portion 71 is inserted into the holdable sub-portion 83b so as to hold the holdable sub-portion 83b from thereinside. In this embodiment, the holdable sub-portion 83b has a front-rear directional inside width L12 set to be less than a front-rear directional width L11 of the cam holding sub-portion 71a. That is, in a state in which the cam holding sub-portion 71a is entered in the holdable sub-portion 83b to hold the holdable sub-portion 83b from thereinside, a clearance or play is formed between the holdable sub-portion 83b and the cam holding sub-portion 71a (i.e., the holdable sub-portion 83b can wobble with respect to the cam holding sub-portion 71a).

As illustrated in FIG. 1, the arm 84 has a locking-piece contact portion 85 formed at an upper end thereof and configured to come into contact with the locking piece 41b of the shift lever 4, and a solenoid coupling portion 86 composed of a circular hole formed between the locking-piece contact portion 85 and the tubular portion 83.

The solenoid 82 comprises a solenoid body 82a internally having a coil wire (not illustrated), and a rod-shaped plunger 82b provided to protrude from the solenoid body 82a.

The plunger 82b is configured to be extendingly and retractingly movable (axially movable) with respect to the solenoid body 82a. In this embodiment, the plunger 82b is always biased by a biasing spring 82e in a direction causing it to protrude with respect to the solenoid body 82a, and configured such that, upon generation of a magnetic force resulting from applying current to the coil wire of the solenoid body 82a, it is retractingly moved (pulled) into the solenoid body 82a against a biasing force of the biasing spring 82e.

The solenoid 82 also comprises a coupling pin 82c provided at a protruding end of the plunger 82b and coupled to the solenoid coupling portion 86 of the shift lock cam 81 in a rotationally movable manner.

The solenoid 82 is communicably connected to a main control unit (not illustrated) provided on the vehicle via a connection line (not illustrated), and communicably connected to an aftermentioned shift-lever parking-position detection element 25 provided in the shifter body 2 via the main control unit.

Figure 9:
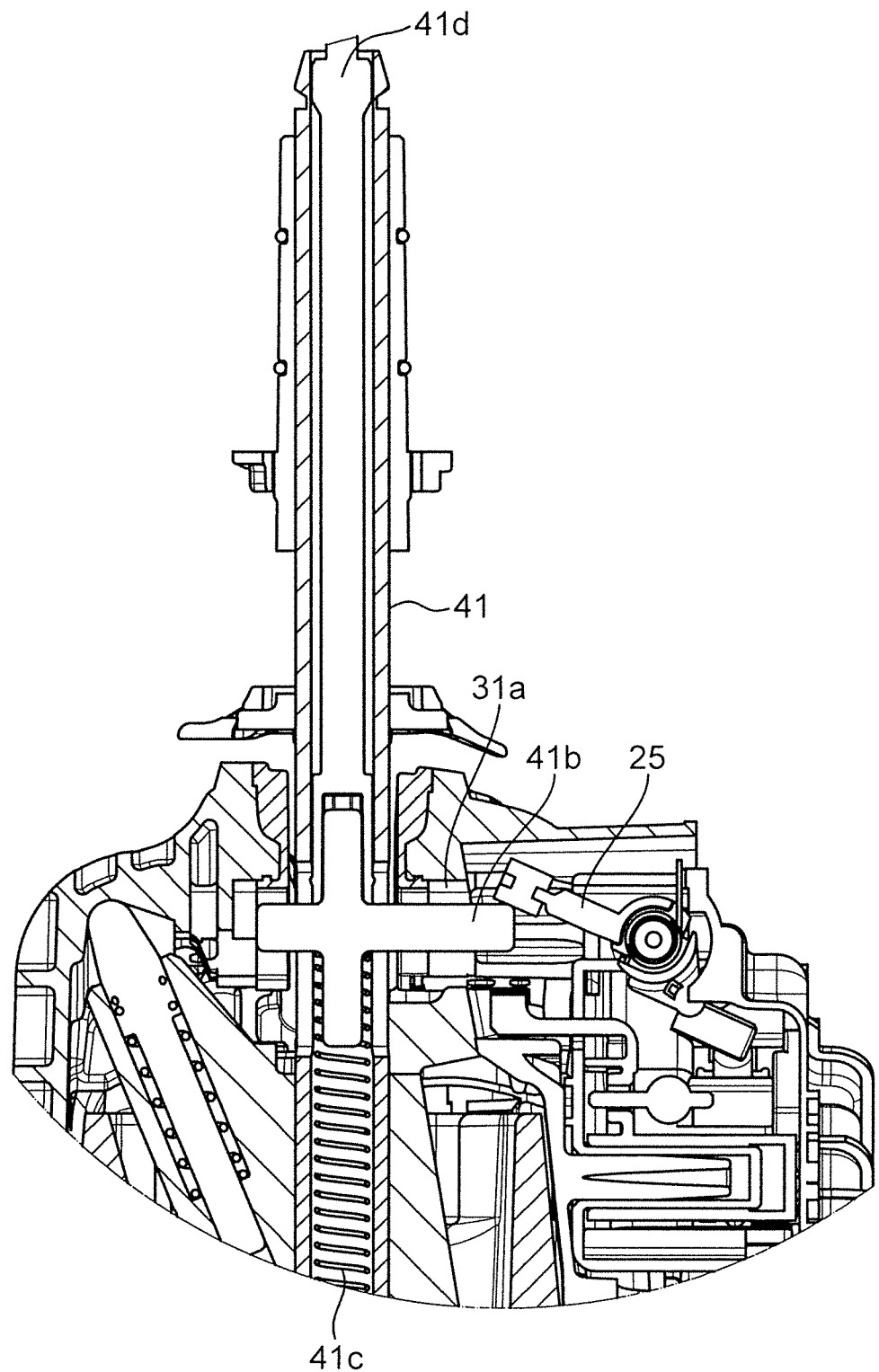
FIG. 9 is a fragmentary sectional view of the automatic transmission shifter in FIG. 1, in a state in which a locking piece of the shift lever is in contact with a shift-lever parking-position detection element when the shift lever is set in a parking range.

Specifically, as illustrated in FIG. 9, the shifter body 2 is provided with a shift-lever parking-position detection element 25 configured to detect that the shift lever 4 is shifted to the parking range position. In this embodiment, the shift-lever parking-position detection element 25 is installed such that, when the shift lever 4 is shifted to the parking range position, the locking piece 41b of the shift lever 4 comes into contact therewith.

The shift-lever parking-position detection element 25 is communicably connected to the main control unit provided on the vehicle.

The solenoid 82 is configured to be controlled by the main control unit in such a manner as to be operated interlockingly with a movement of a brake pedal. More specifically, in a situation where the main control unit detects from the shift-lever parking-position detection element 25 that the shift lever 4 is set in the parking range, when the brake pedal is depressed, the main control unit detects the operation, and, in response to the detection, operates to energize the solenoid 82. Then, along with the energization, the plunger 82b is retractingly moved into the solenoid body 82a.

In this embodiment, the solenoid body 82a of the solenoid 82 is housed in and fixed to a rectangular parallelepiped-shaped casing 82d.

The shift lock switch 8 configured as above is held by the shift-lock-switch holding portion 71 of the switch-unit holding member 7, in a state in which the cam holding sub-portion 71a of the shift-lock-switch holding portion 71 is inserted in the holdable sub-portion 83b of the shift lock cam 81, and the coupling pin 82c of the solenoid 82 is inserted in the solenoid coupling portion 86 of the shift lock cam 81.

Then, in the operation of attaching the shift-lock-switch holding portion 71 to the shifter body 2, the first switch-unit mounting shaft 32 is fittingly inserted into the first-mounting-shaft fit-insertion sub-portion 83a of the shift lock cam 81.

The shift lock cam 81 is held by the cam holding sub-portion 71a with a clearance or play with respect to the cam holding sub-portion 71a. Thus, during the above operation, it is possible to facilitate the fit-insertion of the first switch-unit mounting shaft 32 into the first-mounting-shaft fit-insertion sub-portion 83a even if a relative position between the shift-lock-switch holding portion 71 and the shifter body 2 varies due to production errors thereof.

Figure 14A:
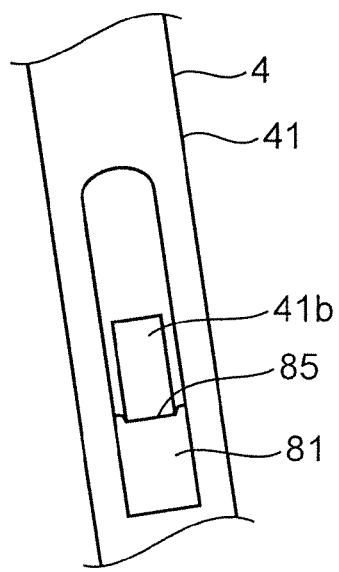
FIG. 14A is an explanatory diagram of a state in which the locking piece of the shift lever is locked by a locking-piece contact portion of the shift lock cam.

Through the above operation, the shift lock cam 81 is positioned by the first switch-unit mounting shaft 32 and installed at a predetermined position with respect to the shaft body 2. Specifically, the arm 84 of the shift lock cam 81 is entered from the lead-out hole 76 into the shifter body 2, and the locking-piece contact portion 85 is located at a position which will lie just below the locking piece 41b when the shift lever 4 is shifted to the parking range position, as illustrated in FIG. 14A. In this state, the shift lock cam 81 is set at a lock position where it locks the shift lever 4. Then, according to actuation of the solenoid 82, the shift lock cam 81 is swingingly moved over the range from the lock position to an unlock (lock-release) position illustrated in FIG. 14B.

The manual-gate-entry detection switch 9 will be described below. As illustrated in FIGS. 10 and 11, the manual-gate-entry detection switch 9 comprises a manual-gate-entry detection element 91, a minus-gate-entry detection element 92, and a plus-gate-entry detection element 93.

The manual-gate-entry detection element 91 is configured to detect that the shift lever 4 is entered into the manual-shift-mode gate 22. The manual-gate-entry detection element 91 is held in such a manner that it protrudes rightwardly from the right sidewall 70a through the receiving hole 72a in the manual-gate-entry detection switch holding portion 72 of the switch-unit holding member 7.

The manual-gate-entry detection element 91 is connected to the main control unit via a circuit provided in the manual-gate-entry detection switch holding portion 72 of the switch-unit holding member 7 and others.

The minus-gate-entry detection element 92 is configured to detect that the shift lever 4 set in the manual-shift-mode gate 22 is entered into the minus gate 22a of the manual-shift-mode gate 22. The minus-gate-entry detection element 92 is held at a position just above a front end of the manual-gate-entry detection element 91 in the manual-gate-entry detection switch holding portion 72 of the switch-unit holding member 7, in such a manner that it protrudes rightwardly from the right sidewall 70a through the receiving hole 72a.

The minus-gate-entry detection element 92 is connected to the main control unit via a circuit of the manual-gate-entry detection switch holding portion 72 of the switch-unit holding member 7 and others.

The plus-gate-entry detection element 93 is configured to detect that the shift lever 4 set in the manual-shift-mode gate 22 is entered into the plus gate 22b of the manual-shift-mode gate 22. The plus-gate-entry detection element 93 is held at a position just above a rear end of the manual-gate-entry detection element 91 in the manual-gate-entry detection switch holding portion 72 of the switch-unit holding member 7, in such a manner that it protrudes rightwardly from the right sidewall 70a through the receiving hole 72a.

The plus-gate-entry detection element 93 is connected to the main control unit via a circuit of the manual-gate-entry detection switch holding portion 72 of the switch-unit holding member 7 and others.

In the operation of attaching the switch-unit holding member 7 to the shifter body 2, the manual-gate-entry detection switch 9 held by the manual-gate-entry detection switch holding portion 72 of the switch-unit holding member 7 in the above manner is installed to a position below the manual-shift-mode gate 22 inside the shifter body 2, through a hole (not illustrated) provided in the shifter body 2.

An operation of the automatic transmission shifter according to the above embodiment will be described below. In the state in which the lever shaft body 41 of the shift lever 4 is shifted to the parking range position of the automatic-shift-mode gate 21, the locking-piece contact portion 85 of the shift lock cam 81 is located just below the locking piece 41b of the shift lever 4, as illustrated in FIG. 14A.

Thus, in this state, the locking-piece contact portion 85 inhibits downward movement of the locking piece 41b of the shift lever 4 to establish a shift lock state in which the pushing operation member 41d of the shift lever 4 cannot be manually pushed, i.e., the locking piece 41b cannot be moved out of the parking range-locking recess 31a (see FIG. 5) thereby inhibiting movement of the lever shaft body 41.

Figure 13:
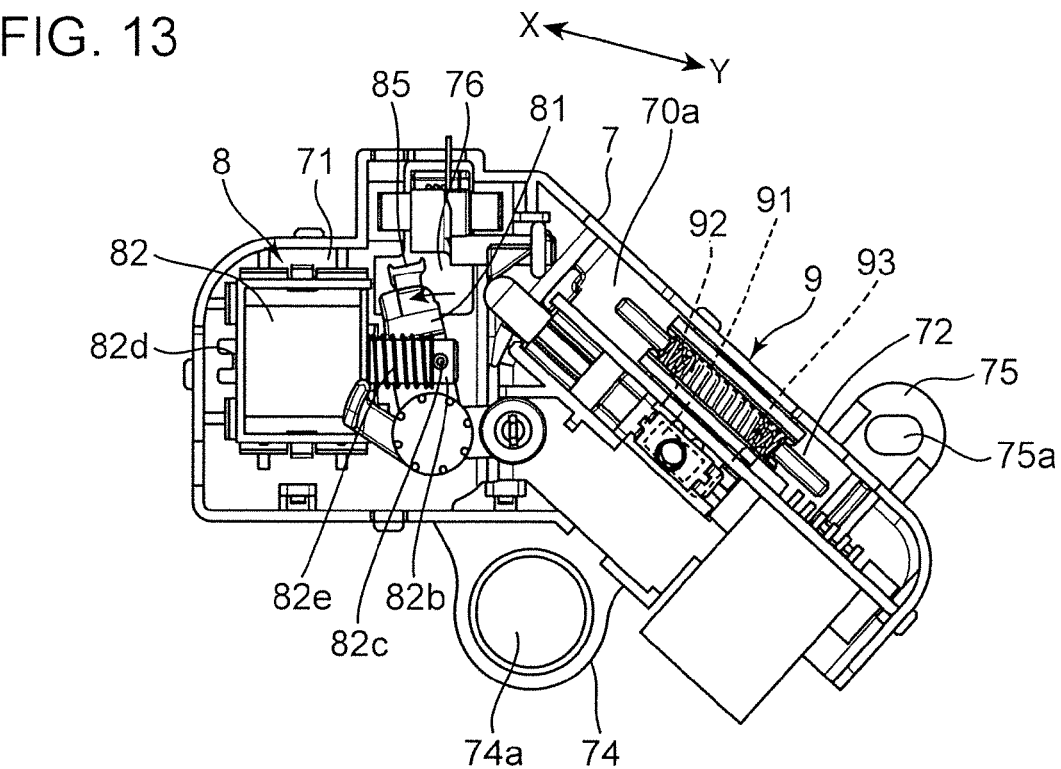
FIG. 13 is an explanatory diagram of an unlocked state established when a shift lock cam of the control switch unit is rotationally moved from the state illustrated in FIG. 10.
Figure 14B:
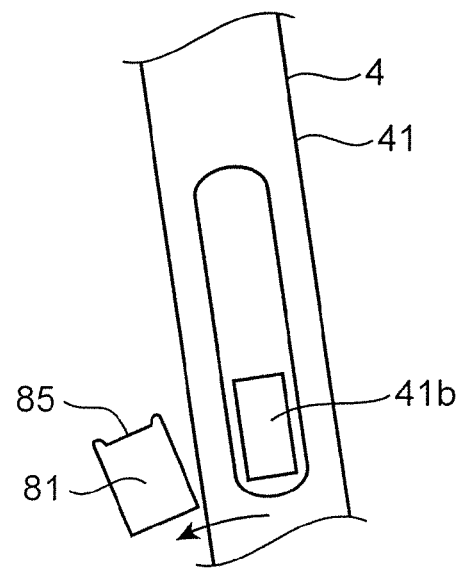
FIG. 14B is an explanatory diagram of a state in which the locked state of the locking piece of the shift lever is released.

In this state, when the brake pedal is depressed, the main control unit detects the operation, and, in response to the detection, operates to energize the solenoid 82. Then, along with the energization, the plunger 82b is retractingly moved into the solenoid body 82a. In conjunction with the retracting movement, as illustrated in FIGS. 12 and 13, the shift lock cam 81 is swingingly moved using the first switch-unit mounting shaft 32 as a pivot shaft in a counterclockwise direction, and the locking-piece contact portion 85 of the shift lock cam 81 is moved to a position beside the locking piece 41b of the shift lever 4, as illustrated in FIG. 14B.

Thus, in this state, when the pushing operation member 41d of the shift lever 4 is manually pushed, the locking piece 41b of the shift lever 4 can be moved downwardly out of the parking range-locking recess 31a, so that the lever shaft body 41 of the shift lever 4 becomes movable along the automatic-shift-mode gate 21. When the depressing operation of the brake pedal is stopped after the lever shaft body 41 of the shift lever 4 is moved out of the parking range, the energization of the solenoid 82 is stopped, so that the plunger 82b is moved by the biasing force of the biasing spring 82e to protrude from the solenoid body 82a, and thereby the shift lock cam 81 is rotationally moved from the position illustrated in FIG. 14B to the original position illustrated in FIG. 14A, in a clockwise direction.

Then, when the lever shaft body 41 is moved from the parking range to the drive range of the automatic-shift-mode gate 21, and further entered from the drive range position to the manual-shift-mode gate 22 through the communication passage 23, the manipulating member-coupling portion 42 is moved from the lever fit-insertion space 64c to the lever loose-fitting portion 65, so that the coupling between the manipulating member-coupling portion 42 and the lever-coupling portion 64 (64a, 64b) is released.

When the lever shaft body 41 is entered from the communication passage 23 into the manual-shift-mode gate 22, the lever shaft body 41 comes into contact with the manual-gate-entry detection element 91, and the main control unit detects the entry. Further, when the lever shaft body 41 is manually moved to the minus gate 22a of the manual-shift-mode gate 22, the lever shaft body 41 comes into contact with the minus-gate-entry detection element 92, and the main control unit detects the entry. Thus, in response to the detection, the main control unit operates to perform a shift-down action once.

On the other hand, when the lever shaft body 41 is manually moved to the plus gate 22b on a rear side of the manual-shift-mode gate 22, the lever shaft body 41 comes into contact with the plus-gate-entry detection element 93, and the main control unit detects the entry. Thus, in response to the detection, the main control unit operates to perform a shift-up action once.

When the lever shaft body 41 is moved in the manual-shift-mode gate 22, the manipulating member-coupling portion 42 is moved within the lever loose-fitting portion 65 in the shift direction, i.e., only the manipulating member-coupling portion 42 is moved with respect to the shifter body 2. Thus, the shift lever 4 and the automatic transmission-manipulating member 6 are not interlockingly moved, so that, even when the shift lever 4 is moved in the manual-shift-mode gate 22 in the front-rear direction, the automatic transmission is maintained in a drive state.

Subsequently, when the lever shaft body 41 is entered from the manual-shift-mode gate 22 into the automatic-shift-mode gate 21 through the communication passage 23, the manipulating member-coupling portion 42 is fitted into the lever fit-insertion space 64c from the lever loose-fitting portion 65 of the automatic transmission-manipulating member 6, so that the manipulating member-coupling portion 42 and the lever-coupling portion 64 (64a, 64b) are coupled together.

Then, when the lever shaft body 41 is shifted to the parking range of the automatic-shift-mode gate 21, the locking piece 41b of the shift lever 4 is disposed at a position just above the locking-piece contact portion 85 of the shift lock cam 81.

In this connection, for example, when the lever shaft body 41 is shifted to the parking range in a situation where the pushing operation member 41d of the shift lever 4 is manually pushed and thereby the locking piece 41*b* is moved downwardly, the locking piece 41*b* is likely to collide with a side surface of the shift lock cam 81. In this case, when the shift lock cam 81 is pressed by the locking piece 41*b*, the shift lock cam 81 is swingingly moved against the biasing force of the biasing spring 82*e* biasing the plunger 82*b* to escape from the locking piece 41*b*, so that the lever shaft body 41 can be shifted to the parking range. Then, after the locking piece 41*b* of the shift lever 4 is moved upwardly by the coil spring 41*c* provided inside the lever shaft body 41, the shift lock cam 81 is swingingly moved to a position just below the locking piece 41*b*.

Further, when the lever shaft body 41 is shifted to the parking range position of the automatic-shift-mode gate 21, the locking piece 41*b* of the shift lever 4 comes into contact with the shift-lever parking-position detection element 25 provided in the shifter body 2, as illustrated in FIG. 9, and the main control unit detects the contact. The main control unit detecting the contact operates to control the shift lock cam 81 such that it is located at a position just below the locking piece 41*b*, until the brake pedal is depressed.

In the above embodiment, the control switch unit comprises the shift lock switch 8 and the manual-gate-entry detection switch 9. However, the present invention is not limited to this configuration, but various modifications may be appropriately made.

For example, the control switch unit may be composed of one of the shift lock switch 8 and the manual-gate-entry detection switch 9.

Further, any control switch other than the shift lock switch 8 and the manual-gate-entry detection switch 9, such as a parking-range-entry detection switch configured to detect entry of the shift lever into the parking range, may be provided in combination with one or both of, or as substitute for the shift lock switch 8 and the manual-gate-entry detection switch 9.

In the above embodiment, the shift lock cam 81 is held by the cam holding sub-portion 71*a* with a clearance or play with respect to the cam holding sub-portion 71*a*. However, the present invention is not limited to this configuration, but various modifications may be appropriately made. For example, the shift lock cam 81 and the cam holding sub-portion 71*a* may be assembled together (unitized) without any clearance or play.

Outline of Embodiment

Last of all, features of the automatic transmission shifter disclosed in the above embodiment and functions/advantages based on the features will be outlined below.

The automatic transmission shifter according to the above embodiment comprises: a shifter body fixedly attachable to a vehicle body; a shift lever swingably held by the shifter body; a control switch unit for controlling the shift lever; and a switch-unit holding member holding the control switch unit, wherein the switch-unit holding member is attached to the shifter body, and the control switch unit has a shifter body-based positioning portion configured to be positioned with respect to the shifter body during an operation of attaching the switch-unit holding member to the shifter body.

In the above automatic transmission shifter, as a result of the operation of attaching the switch-unit holding member to the shifter body, the control switch unit is attached to the shifter body through the switch-unit holding member. Thus, for example, a plurality of switch elements may be held by a single switch-unit holding member, and then the switch-unit holding member may be attached to the shifter body. This makes it possible to readily attach the plurality of switch elements to the shifter body.

Further, the control switch unit has the shifter body-based positioning portion configured to be positioned with respect to the shifter body during the operation of attaching the switch-unit holding member to the shifter body, so that it becomes possible to install the control switch unit to a predetermined position with respect to the shifter body, irrespective of an attachment position of the switch-unit holding member to the shifter body.

Preferably, in the above automatic transmission shifter, the shifter body has a shifter-body reference portion configured to come into contact with the shifter body-based positioning portion, and the control switch unit comprises a shift lock switch having a shift lock cam configured to lock the shift lever at a predetermined position and release the locked state, wherein the shifter body-based positioning portion is formed in the shift lock cam of the shift lock switch.

According to this feature, the switch-unit holding member can be attached to the shifter body while allowing the shifter-body reference portion to come into contact with the shifter body-based positioning portion, so that it becomes possible to accurately install the shift lock cam to a position capable of locking the shift lever at a predetermined position and releasing the locked state.

In addition, although a shift lock component requiring positional accuracy is assembled to the shifter body in a state in which it is unitized with the switch-unit holding member, the shift lock component can be held directly by the shifter body to improve accuracy of assembling to the shifter body.

Preferably, in the above automatic transmission shifter, the shift lock cam is held by the switch-unit holding member, with a clearance therebetween.

For example, suppose that the shift lock cam is held by the switch-unit holding member without any clearance therebetween. In this case, even in a situation where the shift lock cam is held by the switch-unit holding member at a predetermined position with respect to the switch-unit holding member, when the switch-unit holding member is attached to the shifter body, a position of the shift lock cam with respect to the shifter body varies due to production accuracy of the switch-unit holding member and the shifter body, and the shift lock cam is likely to fail to be installed at a predetermined position of the shifter body. In contract, according to the above feature, the shift lock cam is held by the switch-unit holding member, with a clearance therebetween, so that, even when a position of the switch-unit holding member attached to the shifter body varies with respect to the shifter body, the shift lock cam can be installed at a predetermined position with respect to the shifter body, irrespective of the position of the switch-unit holding member.

Preferably, in the above automatic transmission shifter, the shift lock cam is held by the switch-unit holding member, in such a manner as to be rotationally movable with respect to the shifter body, between a lock position where the shift lock cam locks the shift lever at the predetermined position and an unlock position where the shift lock cam releases the locked state of the shift lever, and the control switch unit comprises an actuating member for actuating the shift lock cam, wherein the actuating member is configured to rotationally move the shift lock cam over a range from the lock position to the unlock position.

According to this feature, it becomes possible to rotationally move the shift lock cam between the lock position and the unlock position, smoothly irrespective of the position of the switch-unit holding member.

Preferably, in the above automatic transmission shifter, the shifter body comprises a gate penetrated by the shift lever, wherein the gate comprises an automatic-shift-mode gate configured to allow the shift lever to be moved therealong in an automatic shift mode, a manual-shift-mode gate provided on one side of the automatic-shift-mode gate in a select direction and configured to allow the shift lever to be moved therealong in a manual shift mode, and a communication passage provided between the automatic-shift-mode gate and the manual-shift-mode gate; and the control switch unit further comprises a manual-gate-entry detection switch configured to detect entry of the shift lever into the manual-shift-mode gate.

According to this feature, through an operation of attaching a single switch-unit holding member to the shifter body, the manual-gate-entry detection switch can be installed to a predetermined position, and readily attached to the shifter body.

This application is based on Japanese Patent application No. 2013-133598 filed in Japan Patent Office on Jun. 26, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An automatic transmission shifter comprising:
   a shifter body fixedly attachable to a vehicle body;
   a shift lever swingably held by the shifter body;
   a control switch unit for controlling the shift lever; and
   a switch-unit holding member independent from the control switch unit for holding the control switch unit, wherein:
   the switch-unit holding member is attached to the shifter body;
   the control switch unit includes a shift lock switch having a shift lock cam configured to lock the shift lever at a predetermined position and to release the locked state,
   the shift lock cam being formed with a shifter body-based positioning portion configured to be positioned with respect to the shifter body during an operation of attaching the switch-unit holding member to the shifter body and held by the switch-unit holding member with a clearance therebetween; and
   the shifter body has a shifter-body reference portion configured to come into contact with the shifter body-based positioning portion.

2. The automatic transmission shifter as defined in claim 1, wherein
   the shift lock cam is held by the switch-unit holding member, in such a manner as to be rotationally movable with respect to the shifter body, between a lock position where the shift lock cam locks the shift lever at the predetermined position and an unlock position where the shift lock cam releases the locked state of the shift lever, and
   the control switch unit comprises an actuating member for actuating the shift lock cam, the actuating member being configured to rotationally move the shift lock cam over a range from the lock position to the unlock position.

3. The automatic transmission shifter as defined in claim 1, wherein:
   the shifter body comprises a gate penetrated by the shift lever, the gate comprising an automatic-shift-mode gate configured to allow the shift lever to be moved therealong in an automatic shift mode, a manual-shift-mode gate provided on one side of the automatic-shift-mode gate in a select direction and configured to allow the shift lever to be moved therealong in a manual shift mode, and a communication passage provided between the automatic-shift-mode gate and the manual-shift-mode gate; and
   the control switch unit further comprises a manual-gate-entry detection switch configured to detect entry of the shift lever into the manual-shift-mode gate.

* * * * *